US009789974B2

(12) United States Patent
Burte et al.

(10) Patent No.: US 9,789,974 B2
(45) Date of Patent: Oct. 17, 2017

(54) BRAKE MONITORING SYSTEM

(71) Applicant: Goodrich Corporation, Charlotte, NC (US)

(72) Inventors: Paul R. Burte, Clayton, OH (US); Andrew Walsh, Dayton, OH (US); Todd Rook, Tipp City, OH (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 14/887,069

(22) Filed: Oct. 19, 2015

(65) Prior Publication Data
US 2017/0106995 A1 Apr. 20, 2017

(51) Int. Cl.
G01M 17/00 (2006.01)
B64D 45/00 (2006.01)
B60T 17/22 (2006.01)
F16D 66/00 (2006.01)

(52) U.S. Cl.
CPC ............ B64D 45/00 (2013.01); B60T 17/221 (2013.01); F16D 66/00 (2013.01); B64D 2045/0085 (2013.01); F16D 2066/001 (2013.01)

(58) Field of Classification Search
CPC ............ B64D 45/00; B64D 2045/0085; B60T 17/221; F16D 66/00; F16D 2066/001
USPC ........................ 701/34.1, 31.9, 32.9, 50, 33.7
See application file for complete search history.

(56) References Cited

U.S. PATENT DOCUMENTS 3,582,926 A * 6/1971 Hassan ................... G01K 7/021
188/1.11 E
8,152,246 B2 * 4/2012 Miller ..................... B60T 17/22
188/79.52
8,548,652 B2 * 10/2013 DeVlieg ................... B60T 8/00
188/1.11 L
9,061,661 B2 * 6/2015 Vaney ........................ B60T 8/00
9,671,314 B2 * 6/2017 Followell .............. G01M 17/04
2006/0144997 A1 * 7/2006 Schmidt .................... B64F 5/60
244/100 R
2006/0241819 A1 10/2006 Greene
2008/0149436 A1 * 6/2008 Griffith ..................... B60T 7/12
188/110
2010/0235065 A1 * 9/2010 Logan ................... B60T 13/662
701/80
2015/0145703 A1 * 5/2015 Martin ................... B64D 45/00
340/960

FOREIGN PATENT DOCUMENTS

DE       19713561       5/1998
DE     102010016983    11/2011
EP        1359077      11/2003

OTHER PUBLICATIONS

Extended European Search Report dated Mar. 28, 2017 in European Application No. 16194324.6.

* cited by examiner

Primary Examiner — Shardul Patel
(74) Attorney, Agent, or Firm — Timothy Buckley; Snell & Wilmer L.L.P.

(57) ABSTRACT

In accordance with various embodiments, disclosed is a brake monitoring system for monitoring the health status of the brakes of an aircraft, the aircraft comprising a plurality of brakes, the brake monitoring system comprising conducting a statistical comparison of a brake temperature against a temperature data centrality value based on the temperature values of the plurality of brakes.

19 Claims, 3 Drawing Sheets

BRAKE MONITORING SYSTEM

BACKGROUND

Brake temperature monitoring systems, which may be utilized to indicate the health status of the aircraft brake system, or to indicate a problem with the brake system, may compare a measured brake temperature against a predetermined value. Another method may involve comparing the difference between brake temperatures for brakes on the same axle to a predetermined value. As accurate and early detection of possible mechanical faults in the brakes of an aircraft brake system is important for safety and airline service efficiency, improved methods of determining health status of the aircraft brake system are desired.

SUMMARY

In accordance with various embodiments, disclosed is a brake health monitoring system, comprising: a temperature sensor system comprising a plurality of temperature sensors in thermal communication with a plurality of brakes; and a processor configured to receive temperature measurements of each of the plurality of brakes from the plurality of temperature sensors, the temperature measurements defined as a temperature data set, the processor further configured to calculate a temperature data centrality value based on the temperature data set, the processor further configured to calculate a temperature deviation value for each of the plurality of brakes based on the relative temperatures measured for each of the plurality of brakes compared to the temperature data centrality value, wherein the processor assigns a health status for each of the plurality of brakes. In one embodiment, the processor assigns a health status for each of the plurality of brakes by analyzing the temperature deviation value for each of the plurality of brakes via a process control tool. In one embodiment, each of the plurality of brakes is operatively coupled to a wheel of a landing gear of an aircraft. In one embodiment, the temperature sensor system is configured to obtain multiple brake temperature data sets over multiple time instances. In one embodiment, the multiple time instances are separated by regular time intervals. In one embodiment, the multiple brake temperature data sets are obtained from a single flight. In one embodiment, the temperature sensor system is configured to obtain brake temperature data from a single flight. In one embodiment, the brake temperature data is obtained post flight. In one embodiment, each of the temperature measurements of each of the plurality of brakes is an extreme temperature of the specific brake. In one embodiment, the brake health monitoring system further comprise multiple processors, wherein a communicator system is configured to transmit the temperature data set over the multiple processors via at least one of a wireless transmission, and a wired transmission. In one embodiment, the temperature data centrality value comprises at least one of a median value, and a mean value. In one embodiment, the temperature deviation value comprises one of an absolute difference value, or a ratio value. In one embodiment, the processor assigns a health status via an individual moving range chart.

According to various embodiments, disclosed is a brake health monitoring system for monitoring a health status of a brake system of an aircraft, the brake health monitoring system comprising: at least one temperature sensor in thermal communication with a plurality of brakes of the brake system, the at least one temperature sensor configured to obtain a brake temperature data for the plurality of brakes, the brake temperature data comprising at least one brake temperature data set comprising a plurality of brake temperatures obtained at a specific time, wherein each brake temperature of the plurality of brake temperatures is associated with a specific brake of the plurality of brakes; at least one processor configured to receive the brake temperature data; a communicator system configured to transmit the brake temperature data from the at least one temperature sensor to the at least one processor; wherein the at least one processor is configured to determine a temperature data centrality value based on the brake temperature data; wherein the at least one processor is configured to compare the brake temperature data, with the temperature data centrality value, by the at least one processor, to generate a temperature deviation value data set comprising a plurality of deviation values, wherein each deviation value of the plurality of deviation values is associated with a specific brake of the plurality of brakes; and wherein the at least one processor is configured to analyze the temperature deviation value data set via a process control tool. In one embodiment, the process control tool is an individual-moving range chart. In one embodiment, the temperature data centrality value comprises at least one of a median value, and a mean value. In one embodiment, the brake temperature data comprises multiple brake temperature data sets obtained over multiple time instances, and over at least one particular time of interest.

According to various embodiments, disclosed is a method of monitoring health of a braking system, comprising: measuring temperatures of a plurality of brakes; calculating a centrality value for the measured temperatures, the centrality value based on the measured temperatures; and assigning a health status to each of the plurality of brakes based on a relationship between the centrality value and the measured temperature for each of the plurality of brakes. In one embodiment, the method further comprises calculating deviations of each of the measured temperatures from the centrality value. In one embodiment, the method further comprises indicating the health status for each of the plurality of brakes. In one embodiment, the method further comprises measuring temperatures of a plurality of brakes over multiple time instances. In one embodiment, the multiple time instances are separated by regular time intervals.

BRIEF DESCRIPTION OF THE DRAWINGS

The drawings described herein are for illustration purposes only and are not intended to limit the scope of the present disclosure in any way. The present disclosure will become more fully understood from the detailed description and the accompanying drawings wherein.

DETAILED DESCRIPTION

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of exemplary embodiments herein makes reference to the accompanying drawings, which show exemplary embodiments by way of illustration and its best mode, and not of limitation. While these exemplary embodiments are described in sufficient detail to enable those skilled in the art to practice the invention, it should be understood that other embodiments may be realized and that logical, chemical and mechanical changes may be made without departing from the spirit and scope of the invention. For example, the steps recited in any of the method or process descriptions may be executed in any order and are not necessarily limited to the order presented. Moreover, many of the functions or steps may be outsourced to or performed by one or more third parties. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

In accordance with various embodiments, disclosed is a brake monitoring system 301 for monitoring the health status of the brakes of an aircraft, the aircraft comprising a plurality of brakes, the brake monitoring system 301 comprising conducting a statistical comparison of a brake temperature against a temperature data centrality value based on temperature values recorded from the plurality of brakes. According to various embodiments, the statistical analysis may comprise utilizing a process control tool, such as an individual-moving range chart.

Figure 1:
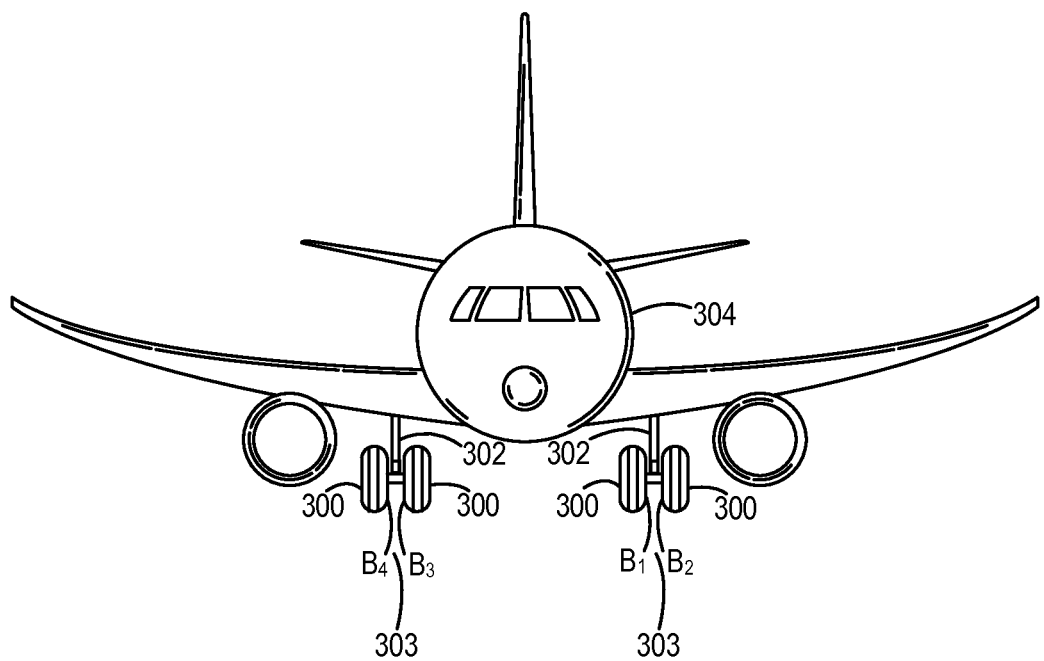
FIG. 1 shows an aircraft comprising a brake system, according to various embodiments.

According to various embodiments, and with reference to FIG. 1, an aircraft 304 may include one or more landing gears 302, each comprising one or more wheels 300, as shown in FIG. 1. According to various embodiments, the aircraft 304 comprises a brake system 303 which functions to slow the wheel 300, and hence the aircraft 304, such as, for example, during landing or a rejected take off. According to various embodiments, brake system 303 comprises a plurality (or "n" number) of brakes, B1, B2, B3, . . . Bn; or Bi, where i=1, 2, 3, . . . n, (shown as B1, B2, B3, and B4 in the figure) wherein each brake of the plurality of brakes is operatively coupled to a wheel 300 of one of the landing gears 302 of the aircraft 304.

Figure 2:
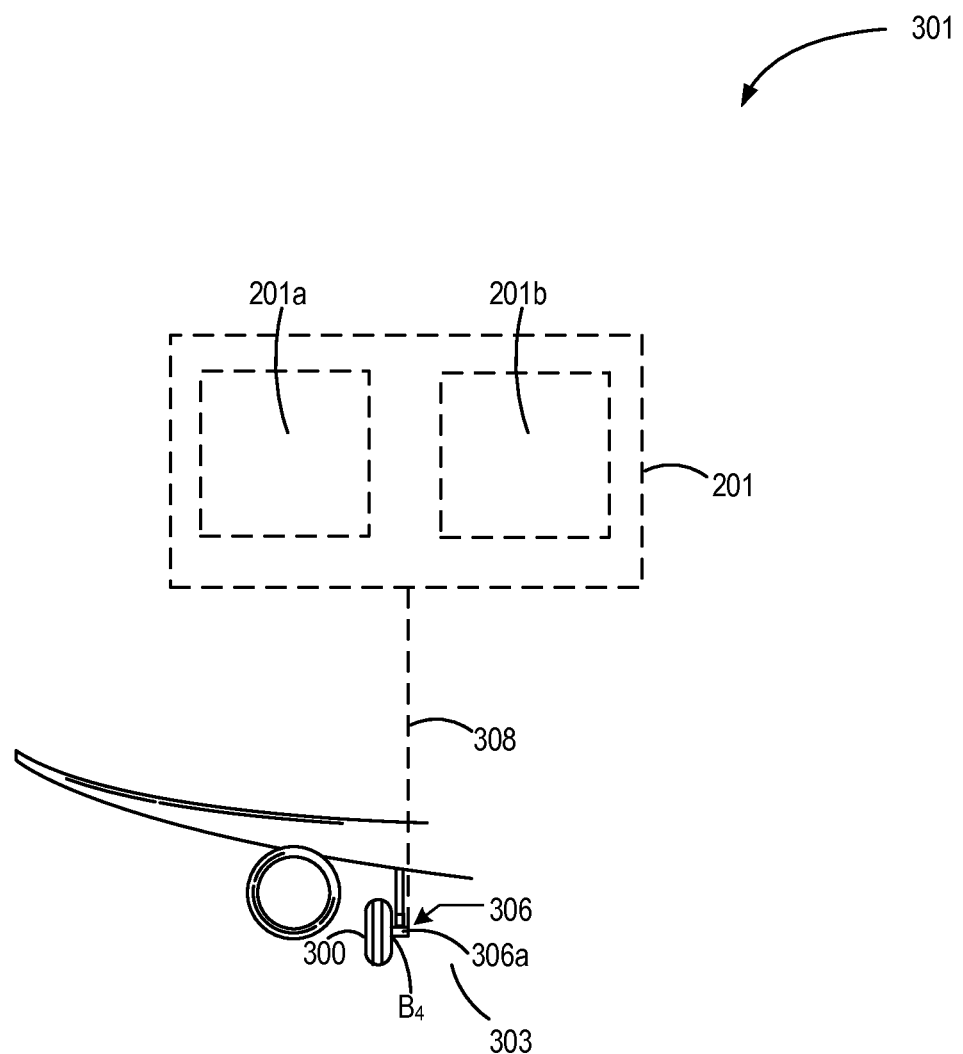
FIG. 2 shows a brake temperature monitoring system, for the brake system of the aircraft of FIG. 1, according to various embodiments.

According to various embodiments, a brake monitoring system 301 shown in FIG. 2, may comprise a temperature sensor system 306, configured to obtain brake temperature data from the brake system 303, at least one processor 201 configured to analyze brake temperature data received from temperature sensor system 306, and a communicator system 308 configured to communicate or transmit the brake temperature data from the temperature sensor system 306 to the at least one processor 201. According to various embodiments, the at least one processor 201 is configured to analyze brake temperature data via a brake monitoring method 100 (shown in FIG. 3) in order to determine the health status of at least one brake of brake system 303. According to various embodiments, the at least one processor 201 is further configured to indicate the health status of the at least one brake.

According to various embodiments, brake monitoring method 100 comprises conducting a statistical comparison of a brake temperature against a temperature data centrality value based on temperature values recorded from the plurality of brakes. In various embodiments, the statistical analysis may comprise utilizing a process control tool, such as an individual-moving range chart.

According to various embodiments, brake temperature data obtained by temperature sensor system 306, comprises at least one brake temperature data set 200. The at least one brake temperature data set 200 comprises a plurality (or "n" number) of brake temperatures, BT1, BT2, BT3 . . . BTn (or BTi, where i=1, 2, 3, . . . n), obtained at a specific time instance, wherein each brake temperature, BTi, of the plurality of brake temperatures is associated with a specific brake Bi of the plurality of brakes of the brake system 303. According to various embodiments, aircraft 304 may have eight wheels 300 each comprising a brake Bi, i=1, . . . , 8. Thus, according to various embodiments, the at least one brake temperature data set 200 may comprise 8 brake temperatures, BTi, (i=1, 2, 3, . . . , 8).

According to various embodiments, temperature sensor system 306 of brake monitoring system 301, comprises at least one temperature sensor (represented by temperature sensor 306a) in thermal communication with each brake Bi. According to various embodiments, temperature sensor system 306 comprises a plurality of temperature sensors 306a. According to various embodiments, temperature sensor 306a may be, for example, a thermocouple temperature sensor, an RTD, an infrared sensor, etc., according to various embodiments. According to various embodiments, temperature sensor 306a may be embedded in a component of the brake, such as the brake's torque tube, for example, to obtain the brake temperature BTi (or indication of the brake temperature, such as a voltage) of the brake. Under typical operating circumstances, the temperature of a brake will change over time, and different components of the brake will register different temperature measurements. Thus, according to various embodiments, temperature sensor system 306 is configured to measure the brake temperature BTi of each brake Bi of the brake system 303, under similar conditions, such that the brake temperatures can be meaningfully compared. To that end, the brake temperatures, BTi, of the at least one brake temperature data set 200 are measured at the same time or at a specific time instance, according to various embodiments. Additionally, according to various embodiments, the brake temperatures, BTi (i=1 . . . n), are measured from the same brake component (e.g., the torque tube) of each brake, Bi. According to various embodiments, the brake temperatures, BTi, of the at least one brake temperature data set 200 may be measured for all of the brakes, Bi, at an instant of time, or otherwise, over an amount of time sufficient to obtain a temperature indication or reading by the temperature sensor 306a, according to various embodiments. According to various embodiments, the brake temperatures, BTi, of the at least one brake temperature data set 200 may be measured over a prolonged time period, wherein, according to various embodiments, an extreme temperature reading over the time period may be registered as the brake temperature BTi for the specific brake Bi. According to various embodiments, such extreme temperature may comprise the hottest temperature registered over the prolonged time period.

According to various embodiments, brake temperature data obtained by temperature sensor system 306, may comprise obtaining more than one or multiple brake temperature data sets 200 over multiple specific times or multiple time instances. As such, the brake temperature data may comprise multiple brake temperature data sets 200 which are correlated to time. According to various embodiments, the times for obtaining multiple brake temperature data sets 200 may be separated by regular time intervals, the multiple brake temperature data sets 200 may be obtained over a specific time range comprising multiple time intervals. For example, a data set may be collected every 2 minutes, for 22 minutes, thus obtaining 11 data sets.

According to various embodiments, brake temperature data 200 may be obtained at particular times of interest, including times during or shortly after the brakes Bi, of aircraft 304 may be used. For example, particular times of interest for obtaining brake temperature data may include the time after a landing and/or rollout of the aircraft 304, taxing before takeoff, and shortly after takeoff, according to various embodiments.

Figure 3:
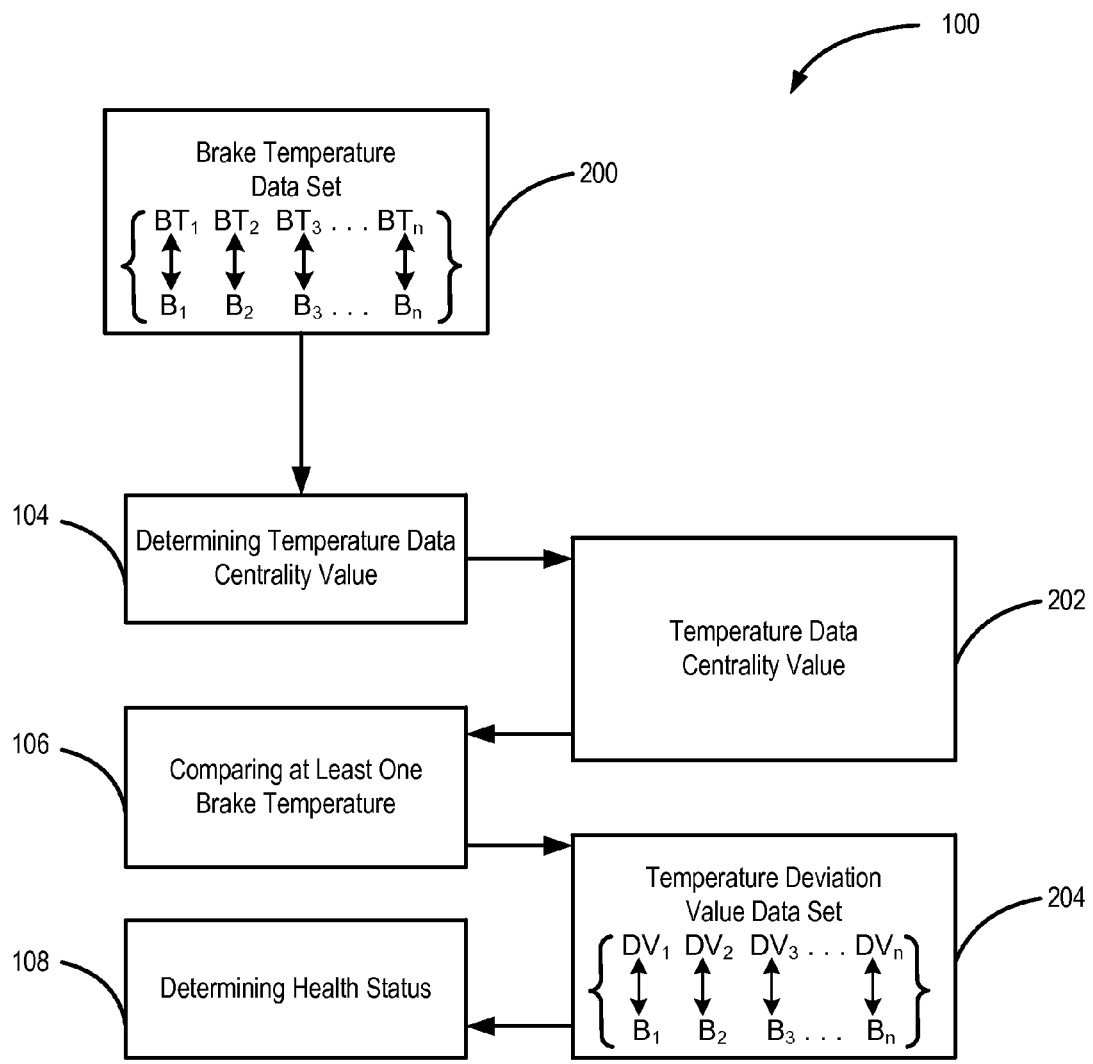
FIG. 3 is a flow chart for a brake monitoring method for the brake temperature monitoring system of FIG. 2, according to various embodiments.

According to various embodiments, the at least one processor 201 is configured to analyze the brake temperature data, comprising the at least one brake temperature data set 200 obtained by temperature sensor system 306, via brake monitoring method 100, illustrated in FIG. 3. According to various embodiments, the at least one processor 201 carries out at least a step 104 of determining a temperature data centrality value ("CV") 202, a step 106 of comparing at least one brake temperature of the plurality of brake temperatures BTi, with the temperature data centrality value 202, and a step 108 of determining the health status of at least one brake, of brake monitoring method 100.

According to various embodiments, step 104 of determining a temperature data centrality value ("CV") 202 is based on the at least one brake temperature data set 200 obtained by the temperature sensor system 306. According to various embodiments, the temperature data centrality value 202 may be the median brake temperature of the plurality of brake temperatures BTi, of the at least one brake temperature data set 200. According to various embodiments, the temperature data centrality value 202 may be the arithmetic mean brake temperature of the plurality of brake temperatures BTi, of the at least one brake temperature data set 200. Various method of obtaining median or arithmetic mean values are known in the art. Such methods may include, for example, excluding outlier values, obtaining a median average, etc., according to various embodiments. Additionally, other values representing a temperature data centrality value 202, and methods of derivation will be apparent to one skilled in the art.

According to various embodiments, the step 106 of comparing at least one brake temperature of the plurality of brake temperatures BTi, with the temperature data centrality value 202, comprises obtaining a deviation value DV for the at least one brake temperature. According to various embodiments, step 106 comprises comparing each brake temperature BTi of the at least one brake temperature data set 200 against the temperature data centrality value 202, to generate at least one temperature deviation value data set 204, comprising a plurality of deviation values. According to various embodiments, the at least one temperature deviation value data set 204 comprises an "n" number of deviation values DV1, DV2, DV3 ... DVn, (or DVi, where i=1, 2, 3, ... n), wherein n is the number of brakes, wherein each deviation value is associated with a specific brake (i.e. B1, B2, B3, ... Bn) of the at least one brake temperature data set 200, as shown in FIG. 3. According to various embodiments, the step 106 of comparing each brake temperature, BTi, with the temperature data centrality value 202 obtained in step 104, and obtaining a deviation value DVi for each brake, may comprise determining an absolute difference between the temperature data centrality value 202 and each brake temperature, BTi, of the plurality of break temperatures, wherein $DV1=|CV-BT1|$; $DV2=|CV-BT2|$; $DV3=|CV-Bt3|$ ... $DV4=|CV-BTn|$; or $DVi=|CV-BTi|$, where $i=1 \rightarrow n$, wherein the at least one temperature deviation value data set 204 is a temperature deviation data set comprising a plurality of deviations (DV1, DV2, DV3 ... DVn; or DVi, where $i=1 \rightarrow n$), wherein each deviation DVi of the plurality of deviations is associated with a brake, Bi, of the plurality of brakes (i.e. B1, B2, B3, ... Bn; or Bi, where i=1, ... n). According to various embodiments, obtaining a deviation value DVi for each brake, may comprise determining a ratio value, which may be a quotient or a multiple of a quotient between BTi and CV, i.e., DVi=BTi/CV or a multiple thereof, according to various embodiments. According to various embodiments, brake monitoring method 100 may comprise obtaining multiple temperature deviation value data sets 204 for multiple brake temperature data sets 200.

According to various embodiments, the step 108 of determining the health status of at least one brake Bi of the brake system 303, comprises analyzing the at least one temperature deviation value data set 204 obtained in step 106. According to various embodiments, step 108 of determining the health status of at least one brake Bi, may comprise determining the health status of all the brakes Bi of the brake system 303 of the aircraft 304. According to various embodiments, step 108 of determining the health status of at least one brake may comprise a process control analysis of the at least one temperature deviation value data set 204.

According to various embodiments, step 108 of determining the health status of at least one brake Bi, may comprise performing a statistical analysis on at least one temperature deviation value data set 204. According to various embodiments, the temperature deviation values set may be analyzed through a statistical process control tool comprising individual moving range chart (Shewhart chart). Such analysis may indicate whether the brake system is operating properly (i.e. is stable), or not, and may be used to determine the health status of each brake (i.e. based on its deviation value). Other methods of statistical analysis include other quality control tools may be apparent to one skilled in the art. According to various embodiments, the at least one temperature deviation value data set 204 may be obtained at a specific time instance. According to various embodiments, at least one temperature deviation value data set 204 may be obtained at a specific time of interest, such as post flight. According to various embodiments, multiple temperature deviation value data sets 204, which are correlated to time may be statistically analyzed. According to various embodiments, the multiple temperature deviation value data sets 204, which are correlated to time, may be from a single flight. According to various embodiments, the multiple temperature deviation value data sets 204, which are correlated to time, may be from multiple flights. According to various embodiments, the multiple temperature deviation value data sets 204, which are correlated to time, may be from a single particular time of interests, or from multiple particular times of interests. According to various embodiments, the multiple temperature deviation value data sets 204, which are correlated to time, may be from a single aircraft.

According to various embodiments, the at least one processor 201 is further configured to indicate the health status of the at least one brake of the brake system 303. According to various embodiments, the at least one processor 201 may indicate the health status of each brake or of the brake system 303. According to various embodiments, the at least one processor may comprise a display unit, such as a cockpit display unit, for indicating brake health status. According to various embodiments, indicating brake health status of at least one brake Bi may comprise indicating a poor health status of any brake(s) found to have a poor health status, on a display device which may be a component of, or in communication with the at least one processor 201, according to various embodiments. Such indication may be relayed via multiple processors 201, via the communicator system 308, according to various embodiments.

According to various embodiments, communicator system 308 of brake monitoring system 301 is configured to communicate or transmit the brake temperature data from temperature sensor system 306 to the at least one processor 201, via a wired transmission, a wireless transmission, or both a wireless and a wired transmission, according to various embodiments. According to various embodiments, a wired transmission, may comprise at least one processor 201 on the aircraft 304. According to various embodiments, the at least one processor 201 may comprise multiple processors, wherein the brake temperature data may be transmitted via multiple processors 201, and may be transmitted both by wire and wirelessly. For example, the brake temperature data may be transmitted by a wired connection to a first processor 201a on the aircraft 304, then wirelessly transmitted to a second processor 201b, which may be onboard the aircraft 304 or outside the aircraft 304, as shown in FIG. 2, according to various embodiments. According to various embodiments, the first processor 201a may comprise a brake control unit on the aircraft 304, for example, which may convert a voltage produced by the temperature sensor system 306 of at least one brake Bi into a respective temperature reading that is communicated to the second processor 201b, according to various embodiments. According to various embodiments, the temperature sensor system 306 and the at least one processor 201 may comprise a single component which may perform both sensing and processing functions, according to various embodiments.

According to various embodiments, the steps of brake monitoring method 100 may be carried out by the at least one processor 201, wherein the at least one processor may comprise a single processor on the aircraft 304 or off the aircraft 304, according to various embodiments. According to various embodiments, the steps of brake monitoring method 100 may be carried out by multiple processors 201, which may be on the aircraft 304, outside the aircraft 304, or both on the aircraft 304 and outside the aircraft 304, according to various embodiments. According to various embodiments, brake temperature data may be obtained via the temperature sensor system 306, and transmitted via communicator system 308 to a first processor 201a comprising a data concentrator on the aircraft 304, then provided to a second processor 201b comprising a central maintenance system, which may be on or off the aircraft 304, according to various embodiments, then either the second processor 201b, or a third processor, which may be on or off the aircraft may carry out the steps of brake monitoring method 100, according to various embodiments.

Systems and methods are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the invention. The scope of the invention is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A brake health monitoring system, comprising:
 a temperature sensor system comprising a plurality of temperature sensors in thermal communication with a plurality of brakes; and
 a processor configured to receive temperature measurements of each of the plurality of brakes from the plurality of temperature sensors, the processor further configured to calculate a temperature data centrality value based on the temperature measurements of each of the plurality of brakes, the processor further configured to calculate a temperature deviation value for each of the plurality of brakes based on the relative temperatures measured for each of the plurality of brakes compared to the temperature data centrality value, wherein the processor assigns a health status for each of the plurality of brakes.

2. The brake health monitoring system of claim 1, wherein the processor assigns a health status for each of the plurality of brakes by analyzing the temperature deviation value for each of the plurality of brakes via a process control tool.

3. The brake health monitoring system of claim 1, wherein each of the plurality of brakes is operatively coupled to a wheel of a landing gear of an aircraft.

4. The brake health monitoring system of claim 1, wherein the temperature measurements of each of the plurality of brakes defines a temperature data set, wherein the temperature sensor system is configured to obtain multiple brake temperature data sets over multiple time instances.

5. The brake health monitoring system of claim 4, wherein the temperature sensor system is configured to obtain brake temperature data from a single flight.

6. The brake health monitoring system of claim 5, wherein the brake temperature data is obtained post flight.

7. The brake health monitoring system of claim 1, wherein each of the temperature measurements of each of the plurality of brakes is an extreme temperature of the specific brake.

8. The brake health monitoring system of claim 1, further comprising multiple processors, wherein a communicator system is configured to transmit the temperature measurements over the multiple processors via at least one of a wireless transmission, and a wired transmission.

9. The brake health monitoring system of claim 1, wherein the temperature data centrality value comprises at least one of a median value, and a mean value.

10. The brake health monitoring system of claim 1, wherein the temperature deviation value comprises one of an absolute difference value, or a ratio value.

11. The brake health monitoring system of claim 1, wherein the processor assigns a health status via an individual moving range chart.

12. A brake health monitoring system for monitoring a health status of a brake system of an aircraft, the brake health monitoring system comprising:
a temperature sensor system in thermal communication with a plurality of brakes of the brake system, the temperature sensor system configured to obtain a brake temperature data set for the plurality of brakes, the brake temperature data set comprising a plurality of brake temperatures obtained at a specific time, wherein each brake temperature of the plurality of brake temperatures is associated with one of the plurality of brakes;
a processor configured to receive the brake temperature data set;
a communicator system configured to transmit the brake temperature data set from the temperature sensor system to the processor;
wherein the processor is configured to determine a temperature data centrality value based on the brake temperature data set for the plurality of brakes;
wherein the processor is configured to compare the brake temperature data set with the temperature data centrality value to generate a temperature deviation value data set comprising a plurality of deviation values, wherein each deviation value of the plurality of deviation values is associated with one of the plurality of brakes; and
wherein the processor is configured to analyze the temperature deviation value data set via a process control tool.

13. The brake health monitoring system of claim 12, wherein the process control tool is an individual-moving range chart.

14. The brake health monitoring system of claim 12, wherein the temperature data centrality value comprises at least one of a median value or a mean value.

15. The brake health monitoring system of claim 12, wherein the brake temperature data set comprises multiple brake temperature data sets obtained over multiple time instances, and over at least one particular time of interest.

16. A method of monitoring health of a braking system, comprising:
measuring, by a plurality of sensors, temperatures of a plurality of brakes;
calculating, by a processor, a centrality value for the measured temperatures, the centrality value based on the measured temperatures for the plurality of brakes;
assigning, by the processor, a health status to each of the plurality of brakes based on a relationship between the centrality value and the measured temperature for each of the plurality of brakes; and
displaying, by a display unit, the health status for the plurality of brakes.

17. The method of claim 16, further comprising calculating deviations of each of the measured temperatures from the centrality value.

18. The method of claim 16, further comprising measuring temperatures of a plurality of brakes over multiple time instances.

19. The method of claim 18, wherein the multiple time instances are separated by regular time intervals.

* * * * *